United States Patent [19]
Pearce

[11] Patent Number: 4,722,172
[45] Date of Patent: Feb. 2, 1988

[54] HARVESTERS

[76] Inventor: Charles E. Pearce, Box 614, Esperance, Western Australia 6450, Australia

[21] Appl. No.: 821,344

[22] Filed: Jan. 22, 1986

[30] Foreign Application Priority Data

Feb. 4, 1985 [AU] Australia ............................. PH9123

[51] Int. Cl.⁴ ...................... A01D 34/04; A01D 43/00
[52] U.S. Cl. ...................................... 56/14.4; 56/158; 56/296
[58] Field of Search .................... 56/13.5, 14.3, 14.4, 56/65, 76, 77, 79, 80, 81, 92, 94, 96, 158, 219, 208, 296

[56] References Cited

U.S. PATENT DOCUMENTS

| | | | |
|---|---|---|---|
| 4,198,803 | 4/1980 | Quick et al. | 56/296 |
| 4,330,982 | 5/1982 | Vissers et al. | 56/14.4 |
| 4,387,554 | 6/1983 | Bedagni | 56/296 |
| 4,592,194 | 6/1986 | Amututz | 56/16.4 |

Primary Examiner—George A. Suchfield
Attorney, Agent, or Firm—Stevens, Davis, Miller & Mosher

[57] ABSTRACT

An attachment for an open fronted harvesting machine to assist movement of cut heads to the harvester conveyor system has a flexible skirt extending rearwardly of the cutter blades. The skirt is supported along its forward edge by a relatively rigid support member which is reciprocated to impart reciprocal movement to the skirt. The support member can be connected to the reciprocating cutter blades of the harvester or can be moved independently thereof.

10 Claims, 5 Drawing Figures

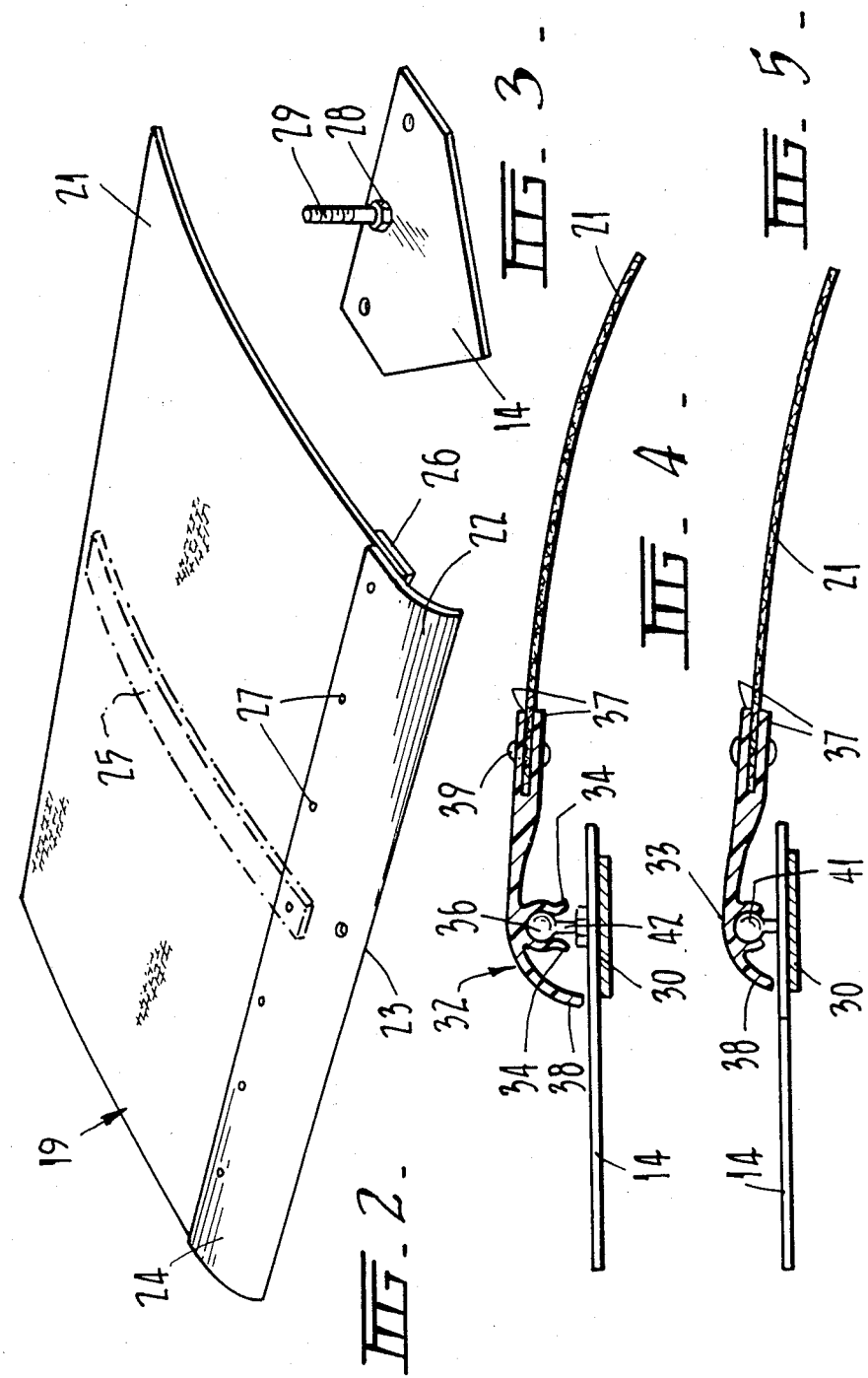

HARVESTERS

BACKGROUND OF THE INVENTION

This invention relates to improvements in harvesters and/or headers to improve the carry of heads from the cutting knives.

Open fronted harvesting machines and headers generally rely on the forward motion of the machine through the crop being harvested to assist movement of the cut heads to a conveyor within the machine. This movement is assisted by a reel on the front of the machine which sweeps the crop into the cutting blades. On some machines, an air stream is directed rearwardly over the cutting blades to further assist the rearward movement of cut heads to the conveyor.

However, in light to medium density and/or short crops, it has been found that the reel is less effective and that cut heads build up on the fingers and can drop or be thrown forwardly onto the ground in front of the machine. The build up can thus substantially reduce the efficiency and operational effectiveness of the harvester/header.

It is therefore desirable to improve the operation of the harvester/header to prevent build up of cut heads on the fingers or combs and beneath the reel.

It is also desirable to provide apparatus which is relatively simple to use, is relatively cheap to manufacture and which acts to prevent the build up of heads on the fingers or combs.

It is also desirable to provide apparatus which can be fitted to a variety of different types of harvesters and/or headers to assist the movement of cut material from the cutter blades.

While the use of air jets is relatively successful, the cost of the equipment to provide the necessary air is relatively expensive.

SUMMARY OF THE INVENTION

According to one aspect of the present invention there is provided an attachment for harvester/header-type machines having cutting means to cut a crop, said cutting means including cutter blades reciprocal substantially transverse to the direction of movement of the machine through the crop, said attachment comprising a flexible skirt extending rearwardly of said cutter blades and means for reciprocally moving said skirt substantially transversely.

In a preferred form of the invention, the skirt is secured to support means extending across the width of the machine adjacent the cutter blades. The support means is either fixed to the cutter blades for movement therewith or is fixed relative to the cutter blades and is reciprocated independently thereof.

The support means may comprise a length of relatively rigid synthetic plastics material, such as PVC, to which the flexible skirt is attached. The skirt may be made of canvas or other similar fabric material, synthetic plastic sheet material, or any other suitable woven or sheet material.

Such material, when supported along one edge and reciprocated in the manner of the invention, produces a flexing and vibrating movement across its width which acts to move cut heads and other material rearwardly from the cutting blades.

The skirt support can be fixed to selected, spaced cutter blades by studs or the like. Alternatively, the selected cutter blades may be fitted with upstanding, headed fastening members to which the skirt support is releasably clipped.

In order that the invention will be more readily understood embodiments thereof will now be described with reference to the accompanying drawings.

DESCRIPTION OF THE DRAWINGS

FIG. 2 is a perspective view of a portion of the attachment of the invention, FIG. 3 is a view illustrating one method of securing the attachment of the invention to a cutter blade, FIG. 4 is a side view illustrating a further form of the attachment invention, and FIG. 5 is a side view of another embodiment of the attachment.

DESCRIPTION OF THE PREFERRED EMBODIMENTS

Figure 1:
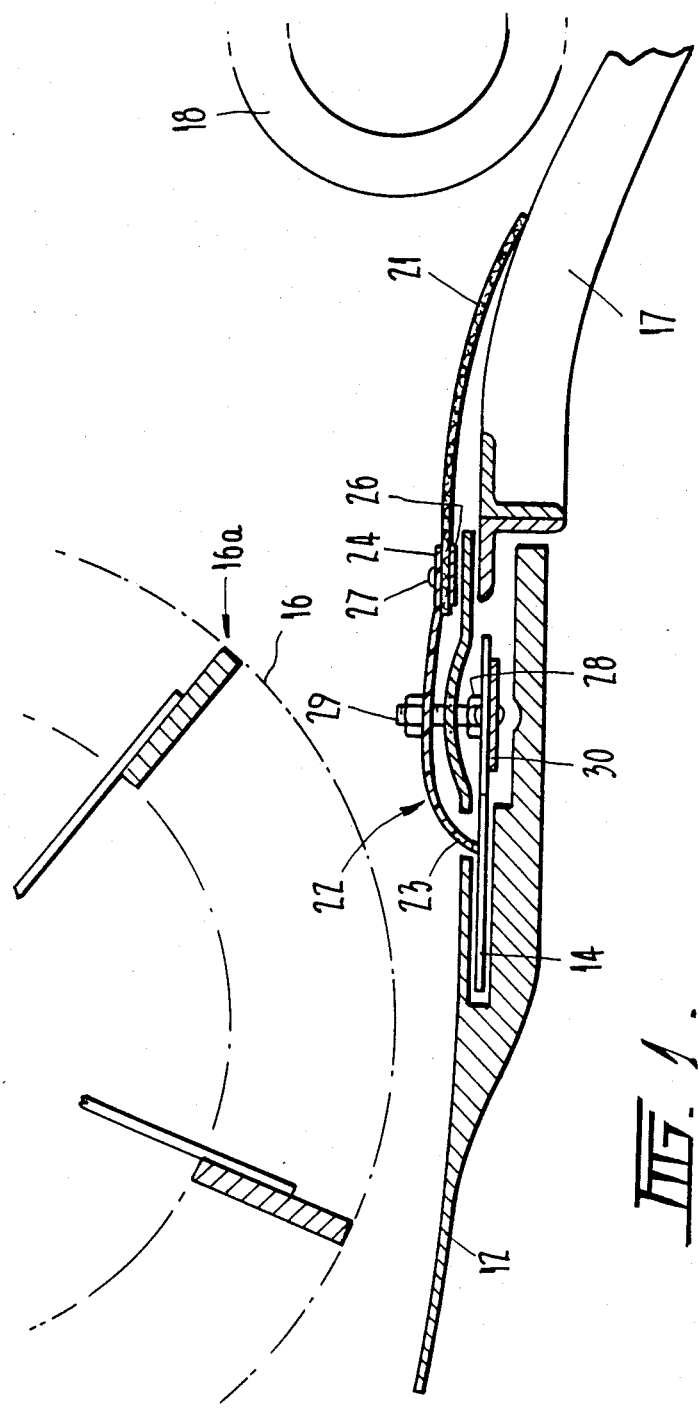
FIG. 1 is a cross-sectional side-elevational view of the fingers and cutter blade assembly of a harvester having the attachment of the invention.

Open front harvesting machines designed for crops such as wheat, barley and the like have a row of forwardly extending fingers which engage and guide the crop to a plurality of transversely reciprocating cutter blades mounted at the base of the fingers.

Referring to the drawings, there is shown in FIG. 1 the forwardly extending fingers 12 and the transversely reciprocating cutter blades 14 which move relatively to the fingers 12 to cut the crop heads from the stalks. A reel 16 extends transversely of the machine and includes a plurality of bats 16a which, on rotation of the reel, act to feed crop heads to the fingers. Desirably, the cut heads move towards the auger platform 17 from where they are conveyed by the table auger 18.

In the known machines, the area between the reel 16, the auger platform 17 and the table auger 18 is a "dead spot" and in which a build up of cut material which can occur, particularly when harvesting light to medium density crops. Such build up of cut material can spill forwardly and onto the ground in front of the machine resulting in a lowering of harvesting efficiency.

In accordance with the present invention, the attachment 19 comprises a flexible skirt 21 extending transversely of the machine along the length of the auger platform 17. In the embodiment illustrated in FIG. 1, the forward edge of the skirt 21 is mounted to a relatively rigid support member 22 which is fixed to, and reciprocates with the cutter blades 14. Thus, the support member 22 and the attached skirt 21 moves with the reciprocating cutter blades 14. This movement, together with the forward motion of the machine, causes cut material to move from the cutting position to the table auger 18 without a build up of material on the auger platform 17. The support member 22 is preferably formed of an extruded section of synthetic plastic material, such as polyvinyl chloride. The forward portion 23 of the support member 22 is curved downwardly to sit on an upper surface of the cutter blade 14. A rear portion 24 is fastened to the forward edge of the skirt 21 using a clamping strip 26 and rivets 27. However, it will be appreciated that any other suitable forms of connection between the forward edge of the skirt 21 and the cutter blades 14 may be utilized in the performance of the invention.

The support member 22 is preferably fixed to selected spaced cutter blades 14 across the width of the machine, one fixing method being illustrated in FIG. 3. The selected cutter blades 14 are each provided with a fixed nut 28 with which is engaged a stud 29. The support member 22 is located on the studs 29 so that the support member 22 and the skirt 21 move with the reciprocating movement of the cutter blades 14 effected by the cutter bar 30 to which the blades 14 are attached.

In an alternative arrangement the support member 22 may be mounted for reciprocal or orbital movement relative to the fingers 12 and independently of the movement of the cutter blades 14.

The skirt 21 is preferably formed of a canvas or similar fabric material. Such material is relatively hard wearing to ensure a relatively long life. If desired, a number of resilient, curved strips 25 of plastic material or the like (shown in dotted lines in FIG. 2) may extend rearwardly from the support member 22 across the top of the skirt 21 to bias the rear edge of the skirt 21 onto the auger platform 17.

In the embodiment shown in FIG. 4, the support member 32 comprises a length of extruded synthetic plastic material having a pair of opposed walls 34 defining a channel to receive the undercut heads 36 of a plurality of fastening members 42 mounted on selected cutting blades 14 across the width of the machine. A front wall 38 of the support member 32 extends downwardly and forwardly towards the cutting blade 14 while the rearward portion of the member 32 has a slot defined by the flanges 37 to receive the skirt 21. Rivets 39 secure the skirt 21 in the slot.

In a further embodiment illustrated in FIG. 5, the support member 33 has a substantially lower profile to assist movement of cut heads towards the rear of the machine. In this embodiment, the fastening members 41 are relatively short and the length of the walls 34 and front wall 38 are correspondingly shorter to reduce the overall height of the support member 33.

With both embodiments of FIGS. 4 and 5, the respective support members 32 and 33 are a snap fit onto the respective heads 36 and 41. This enables quick removal and replacement of the attachment as required. If desired, the attachment can be formed of a plurality of individual sections which can be assembled across the width of machines of various sizes.

It has been found that, with the preferred embodiments of the invention, and with the flexible material attached to the cutter blades by a strip of relatively rigid PVC material, the crop cut by the cutter blades passes quickly rearwardly from the cutter blades to the auger platform behind the blades. Substantially no build up of crop on the combs or fingers was experienced when the attachment of the invention was used although such a build up did occur, and crop was thrown out of the harvester, when the attachment was removed.

It will be understood that the attachment of the invention may be used with any harvester/header machine, having long or short tooth combs and having either fixed or adjustable reels. The apparatus may also be used in conjunction with an air blower to provide further assistance in movement of cut crop towards the table auger.

Further, harvester/header machines may be constructed incorporating the skirt of the invention either as an integral part of the cutter bar or with the attachment being separately reciprocated relative to the auger table.

I claim:

1. An attachment for a harvesting/header-type machine having cutting means to cut crop and conveyor means to convey the cut crop away from the cutter means, said cutter means including a relatively fixed cutter bar and cutter blades reciprocating relatively to the cutter bar substantially transversely to the direction of movement of the machine through the crop, the attachment comprising a support member detachably mounted to the cutting means and a shirt of flexible plastic or fabric material fixed to and extending from the support member towards the conveyor means, the support member being connected to reciprocating parts of the cutting means and having a front edge located adjacent the cutter blades.

2. An attachment according to claim 1 wherein said a support member is fastened to a front edge portion of said skirt.

3. An attachment according to claim 1 wherein said support member is attached to selected, spaced cutter blades by studs extending from the selected cutter blades so that the support member and skirt move therewith.

4. An attachment according to claim 1 wherein said support member has wall means defining a narrow throated channel and headed fasteners extending from selected, spaced cutter blades releasably engage within the channel so that the support member and skirt move with the cutter blades.

5. An attachment according to claim 1 wherein said support member has a front wall which slopes upwardly and rearwardly from the cutter blades.

6. An attachment according to claim 1 wherein means for reciprocating said support member includes means to reciprocate said support member independently of said cutter blades.

7. An attachment according to claim 1 wherein said skirt is flexible and is attached by a front edge portion to a substantially rigid support member, and means for reciprocating said skirt includes means connecting said support member to said cutting blades.

8. An attachment according to claim 1 wherein a plurality of spaced resilient, curved plastic strips extend rearwardly from the support member beneath the skirt.

9. In a harvesting machine having cutting means to cut a crop, said cutting means including a row of forwardly extending fingers, a plurality of cutter blades mounted at the rear of the fingers and reciprocal relative thereto, an auger platform extending rearwardly and downwardly from the cutter blades and an auger conveyor, the improvement comprising a flexible skirt attached to a support member extending rearwardly from the cutter blades towards the auger conveyor, the support member being mounted along a front edge portion of the skirt, and means to reciprocate the support member and skirt transversely relative to the direction of movement of the machine.

10. The improvement according to claim 9, wherein said means to reciprocate the support member and skirt comprises attachment means to connect the support member to selected cutter blades.

* * * * *